Figure 1:
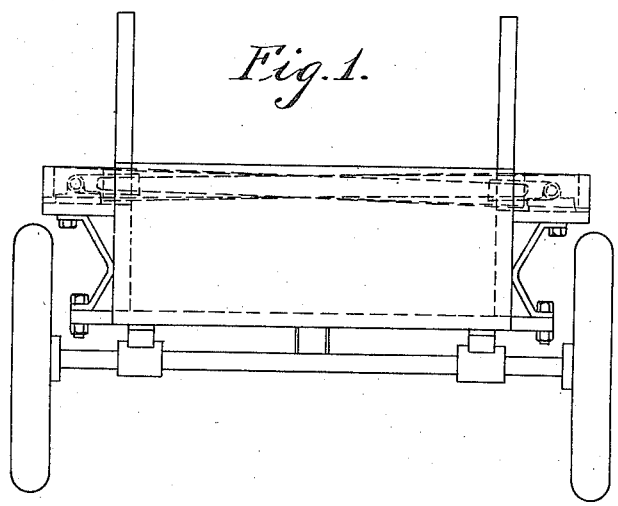

W. P. SHATTUCK.
OUTING TRAILER.
APPLICATION FILED JAN. 15, 1916.

1,229,534.

Patented June 12, 1917.
3 SHEETS—SHEET 1.

Inventor:
William P. Shattuck.
by C. D. Enochs
Attorney.

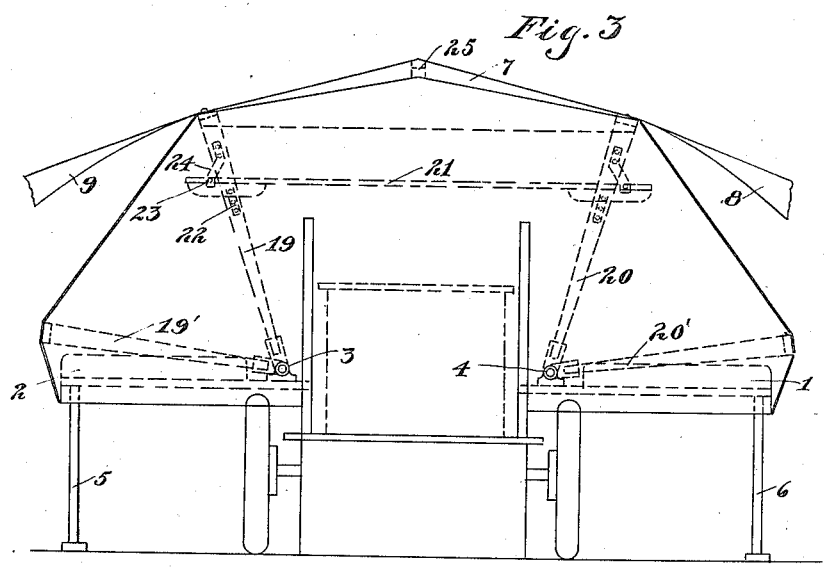

W. P. SHATTUCK.
OUTING TRAILER.
APPLICATION FILED JAN. 15, 1916.
1,229,534.
Patented June 12, 1917.
3 SHEETS—SHEET 3.
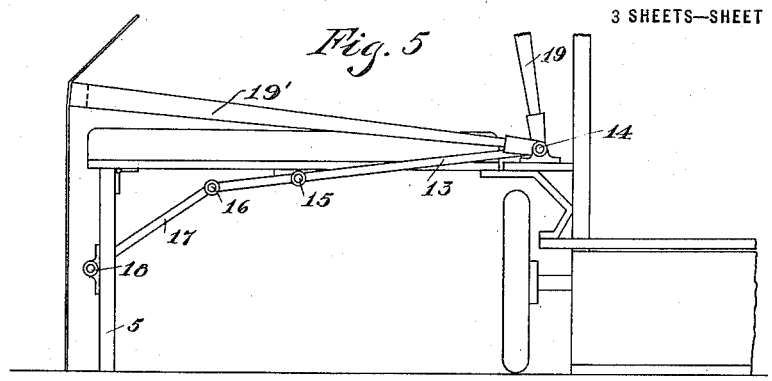
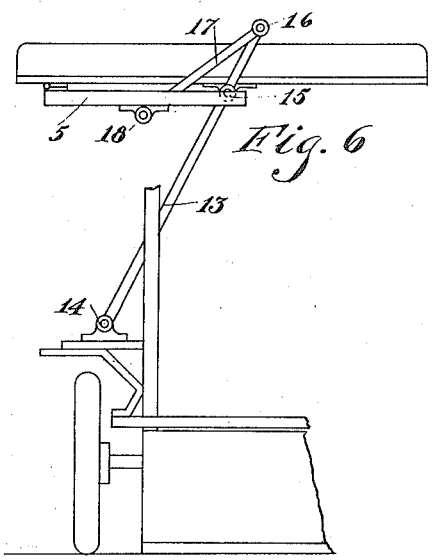
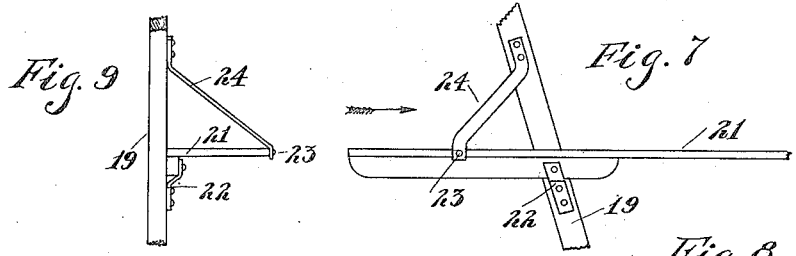
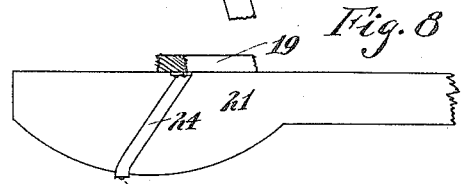
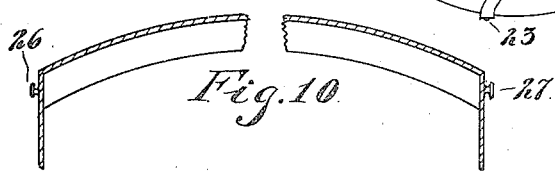
Inventor:
William P. Shattuck.
by C. D. Enochs
Attorney.

UNITED STATES PATENT OFFICE.

WILLIAM P. SHATTUCK, OF MINNEAPOLIS, MINNESOTA.

OUTING-TRAILER.

1,229,534. Specification of Letters Patent. Patented June 12, 1917.

Application filed January 15, 1916. Serial No. 72,266.

*To all whom it may concern:*

Be it known that I, WILLIAM P. SHATTUCK, a citizen of the United States, residing at Minneapolis, in the county of Hennepin and State of Minnesota, have invented certain new and useful Improvements in Outing-Trailers, of which the following is a specification.

This invention relates to outing trailers, and particularly that type of trailer adapted to be drawn behind an automobile or other vehicle, and which is convertible from a commercial trailer to one that combines sleeping cots, shelter tent, and other necessary equipment for outing life.

One object of my invention is to provide in an outing trailer a strong, light, compact trailer adapted to carry a complete camping outfit.

Another object of my invention is to provide in an outing trailer a shelter tent, which may be readily folded into a compact form, yet easily and quickly opened into a substantial and spacious shelter tent.

Another object of my invention is to provide in an outing trailer, having a shelter tent, means for quickly and firmly bracing the shelter tent when it is set up.

Another object of my invention is to provide in an outing trailer a sleeping cot, which may be normally carried within the body of the trailer, but which may be readily extended outwardly from the trailer.

Another object of my invention is to provide in an outing trailer a sleeping cot which, when ready for use in camping position, extends outwardly from the trailer, but which when in a traveling position rests within the body of the trailer, and during the act of swinging from the traveling position to the camping position is maintained in a substantially horizontal position so the bed will not be disturbed in the act of making or breaking camp.

Another object of my invention is to provide in an outing trailer a shelter tent and a sleeping cot in such manner that the sleeping cot extends outwardly from the trailer when in a camping position and is covered by the shelter tent, but may be swung to a traveling position within the body of the trailer and the tent folded in over the cot at the same time.

Another object of my invention is to provide in an outing trailer having an outwardly extending sleeping cot substantial supports for the sleeping cot at the trailer side thereof, and also at the outward side thereof.

Another object of my invention is to provide in an outing trailer a shelter tent having a fly that may be raised from the body of the tent, allowing a free circulation of air through an opening in the body of the tent that is protected with screening to keep from the occupants of the tent any insects that might otherwise pass therein.

Another object of my invention is to provide in an outing trailer that carries in a traveling position one or more sleeping cots and a shelter tent within the body, means whereby the sleeping cot and shelter tent may be quickly opened, leaving a compartment in the body of the trailer free from the sleeping quarters, for cooking, eating or amusement purposes.

Another object of my invention is to provide in an outing trailer a shelter tent, a sleeping cot, and living quarters under the shelter tent, which when in camping position are normally raised well off of the ground.

With these and incidental objects in view my invention consists of certain novel features of construction and combination of parts, the essential elements of which are set forth in appended claims and a preferred form of embodiment of which is hereinafter described with reference to the drawings which accompany and form a part of this specification.

Figure 2:
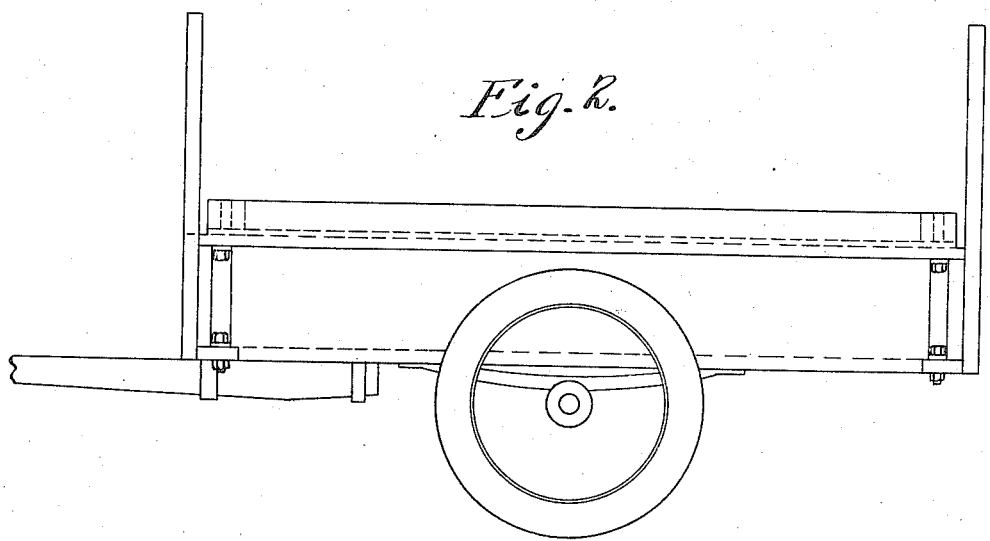

In the drawings, Figure 1 is a rear elevation of my improved outing trailer with the equipment folded inboard. Fig. 2 is a side elevation of the same. Fig. 3 is a rear elevation of the outing trailer in camping position, and Fig. 4 is an isometric projection of the same. Fig. 5 is an enlarged rear elevation of a portion of the rear end of the trailer with the bed folded outboard. Fig. 6 is the same view with the bed in an intermediate position between the inboard and outboard positions. Fig. 7 is an enlarged side elevation of a portion of one of the bows and shelf. Fig. 8 is a plan view of the same, and Fig. 9 is a view taken in the direction of the arrow, Fig. 7. Fig. 10 is a side elevation of the center brace shown in Fig. 3, with a portion of the canvas removed.

While I am aware that camping trailers have been built previous to mine, yet I believe myself to be the first to have devised an outwardly swinging cot and an outwardly extending shelter tent that can be folded inboard the trailer, and I propose to claim these broadly, and while some of the claims will necessarily be limited by the state of the art, I believe myself to be entitled to basic protection on these features and certain others incidental thereto.

The trailer is designed so that the beds and shelter tent may be folded within the body of the trailer, as plainly shown in Figs. 1 and 2, or may be extended outboard, as shown in Figs. 3 and 4.

In Fig. 3 the cots or beds 1 and 2 have been swung outwardly and are supported at 3 and 4 to the flare board of the trailer, and by supports 5 and 6 at the outer edge of the cots.

The shelter tent 7 is also shown unfolded, so as to be disposed over the complete camping outfit, and flies 8 and 9 raised from the side of the tent disclose the windows 11, which may be covered by netting, if desired, for ventilation.

Fig. 4 also clearly shows the manner in which the cot 1 is disposed within the tent and the free circulation of air under the tent if the end is turned back, as at 12.

The cots shown in the inboard position in Fig. 3 are in my preferred construction swung by means disclosed in Figs. 5 and 6. An arm 13, Fig. 5, pivoted at 14 carries on a journal support the weight of the bed at 15, and extending beyond has a journal support at 16, carrying a bracing arm 17 to which the supporting leg 5 is hinged at 18.

When the bed is being swung inboard, as shown in Fig. 6, the arm 13 swings about the point 14, and the bed swinging at 15 is readily maintained in a horizontal position, while the link 17 will double the leg 5 underneath the bed as it is swung to the inboard position.

Supporting bows 19 and 20, Fig. 3, are hinged at 3 and 4, as are also the bows 19' and 20', and these bows are adapted to be folded one within the other in an inboard position on top of the two cots 1 and 2, so that the entire camping outfit may be disposed within the body of the trailer, as shown in Figs. 1 and 2.

When the cot and shelter tent have been opened to their outboard position, a pair of braces 21 are placed in position as shown in Fig. 3 to stiffen and strengthen the bows 19 and 20, and Figs. 7, 8 and 9 disclose the manner in which the connection is made between the braces and the bows. The brace 21 clamped by support 22 to the bow 19, and supported at 23 by the brace 24 allows the brace 21 to be sprung from the resilient brace 24 and removed when the tent is to be lowered.

An additional brace 25 or ridge pole, Figs. 3 and 10, is also provided and has buttons 26 and 27 by which the tent may be fastened thereto and thus maintains an arch in the top of the shelter tent.

It is readily seen from Figs. 3 and 4 that the body of the trailer itself is entirely free when the cots and shelter tents have been extended, giving ample room for outing or amusement purposes, and this open portion may be termed the living quarters and the sleeping cots are raised well off of the ground so as to give a circulation of air below when desired, thus preventing the camp from becoming damp or chilled from direct contact with the ground.

While I have described my invention and illustrated it in one particular design, I do not wish it understood that I limit myself to this construction, as it is evident that the application of my invention may be varied in many ways within the scope of the following claims.

I claim:

1. The combination with a trailer having a pair of supporting wheels and a body, of a cot, a shelter tent, link members connecting said cot with said body, whereby said cot may be swung from a position within and across said body to a position extending outwardly from said trailer, supporting bows hinged on said body for supporting said shelter tent, whereby said shelter tent may be raised to a position covering said trailer and said cot, when said cot is in an outwardly extending position, or folded over said cot when said cot is in an inboard position.

2. The combination with a trailer having a pair of supporting wheels and a body, of a cot, a shelter tent, connecting means between said cot and said body, whereby said cot may be disposed either within said body or in an extended position without said body, supporting bows for said shelter tent hinged to said body, said bows being adapted to fold over said cot when it is disposed within said body, or to be extended above said cot when said cot is disposed outboard of said body.

3. The combination with a trailer having a pair of supporting wheels and a frame, of a bed, an arm hinged to said frame at one end and to said bed intermediate of the ends of said arm, leaving an extension beyond said bed hinge, a support hinged to the outer portion of said bed, and a link extended from the hinged point of said support to a hinged connection on the extension of said arm attaching said bed and said frame.

4. In an outing trailer, the combination of a body, a shelter tent, two oppositely disposed bows hinged on said body for supporting said shelter tent, said bows being adapted to fold one above the other within said trailer body or to be extended upwardly and laterally beyond said body.

5. In an outing trailer the combination of a trailer body, a shelter tent, right and left hand bows supporting said shelter tent on said body and hinged to said body and adapted to fold one within the other to a traveling position, or extend upwardly and laterally beyond said body for a camping position.

6. In an outing trailer the combination of a shelter tent, a trailer body having flare boards on either side thereof, oppositely disposed bows hinged on said flare boards for supporting said shelter tent, said bows being adapted to fold outwardly for a camping position and inwardly and across for a traveling position.

7. In an outing trailer, the combination of a trailer body, a shelter tent, a supporting bow hinged on the right side of said body, a second supporting bow hinged on the left side of said body, said bows supporting said shelter tent, and said hinged connections allowing said bows to fold one above the other within said body for a traveling position or extend upwardly and outwardly for a camping position.

WILLIAM P. SHATTUCK.